(12) United States Patent
Sarusi et al.

(10) Patent No.: US 10,747,700 B1
(45) Date of Patent: Aug. 18, 2020

(54) DYNAMICALLY CONFIGURABLE PIPELINE

(71) Applicant: Amazon Technologies, Inc., Seattle, WA (US)

(72) Inventors: Adiel Sarusi, Hod Hasharon (IL); Ron Diamant, Albany, CA (US); Ori Weber, Tel Aviv (IL); Erez Izenberg, Tel Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 15/832,546

(22) Filed: Dec. 5, 2017

(51) Int. Cl.
*G06F 13/40* (2006.01)
*G06F 13/42* (2006.01)
*G06F 13/16* (2006.01)

(52) U.S. Cl.
CPC ...... *G06F 13/4022* (2013.01); *G06F 13/4045* (2013.01); *G06F 13/1652* (2013.01); *G06F 13/4068* (2013.01); *G06F 13/4247* (2013.01)

(58) Field of Classification Search
CPC ............. G06F 13/4022; G06F 13/4045; G06F 13/4247; G06F 13/1652; G06F 13/4068; H04L 47/34
See application file for complete search history.

(56) References Cited

U.S. PATENT DOCUMENTS

| | | | |
|---|---|---|---|
| 2012/0207020 A1* | 8/2012 | Li | H04L 47/125 370/235 |
| 2019/0155666 A1* | 5/2019 | Dobbs | G06F 15/76 |

* cited by examiner

*Primary Examiner* — Ernest Unelus
(74) *Attorney, Agent, or Firm* — Kilpatrick Townsend & Stockton LLP

(57) ABSTRACT

Techniques disclosed herein relate to dynamically configurable multi-stage pipeline processing units. In one embodiment, a circuit includes a plurality of processing engines and a plurality of switches. Each of the plurality of processing engines includes an input port and an output port. Each of the plurality of switches comprises two input ports and two output ports. For each processing engine, the input port of the processing engine is electrically coupled to one of the switches, the output port of the processing engine is electrically coupled to another one of the switches, and the input port of the processing engine is electrically coupled to the output port of each of the processing engines by the switches.

16 Claims, 14 Drawing Sheets

Pipeline operations: Engine 1 —> 2 —> 3 —> 4 —> 4 —> 3 —> 4:

Route:

| Sequence | Switch | Input port | Output Port |
|---|---|---|---|
| 1. | S1 | 1 | 1 |
| 2. | S2 | 1 | 1 |
| 3. | S3 | 1 | 1 |
| 4. | S4 | 1 | 1 |
| 5. | S5 | 1 | 0 |
| 6. | S1 | 0 | 0 |
| 7. | S2 | 0 | 0 |
| 8. | S3 | 0 | 0 |
| 9. | S4 | 1 | 1 |
| 10. | S5 | 0 | 0 |
| 11. | S1 | 0 | 0 |
| 12. | S2 | 0 | 0 |
| 13. | S3 | 1 | 1 |
| 14. | S4 | 1 | 1 |
| 15. | S5 | 1 | 1 |

FIG. 7

DYNAMICALLY CONFIGURABLE PIPELINE

BACKGROUND

With the increasing amount of data to be processed and transported, there is an increasing need for a processing system that can provide significantly faster performance than existing processing systems. One way to improve the performance of a processing system is to use a multi-stage pipeline structure in the processing system.

Due to the long development time (e.g., over 2 years) and long deployment period (e.g., 5-10 years) of integrated circuits (ICs), it may be desirable to design multi-stage pipeline ICs in a configurable manner such that the ICs may be suitable for different applications, including possible future new applications. For example, it may be desirable for a pipeline structure in a network device to allow both encryption after digital signature and digital signature after encryption. It may also be desirable for a pipeline structure in a network device to be able to handle current protocols and future new protocols.

BRIEF DESCRIPTION OF THE DRAWINGS

Various embodiments in accordance with the present disclosure will be described with reference to the drawings, in which:

FIG. 7 illustrates an example configuration of the configurable pipeline shown in FIG. 6B, according to certain embodiments;

DETAILED DESCRIPTION

Figure 1:
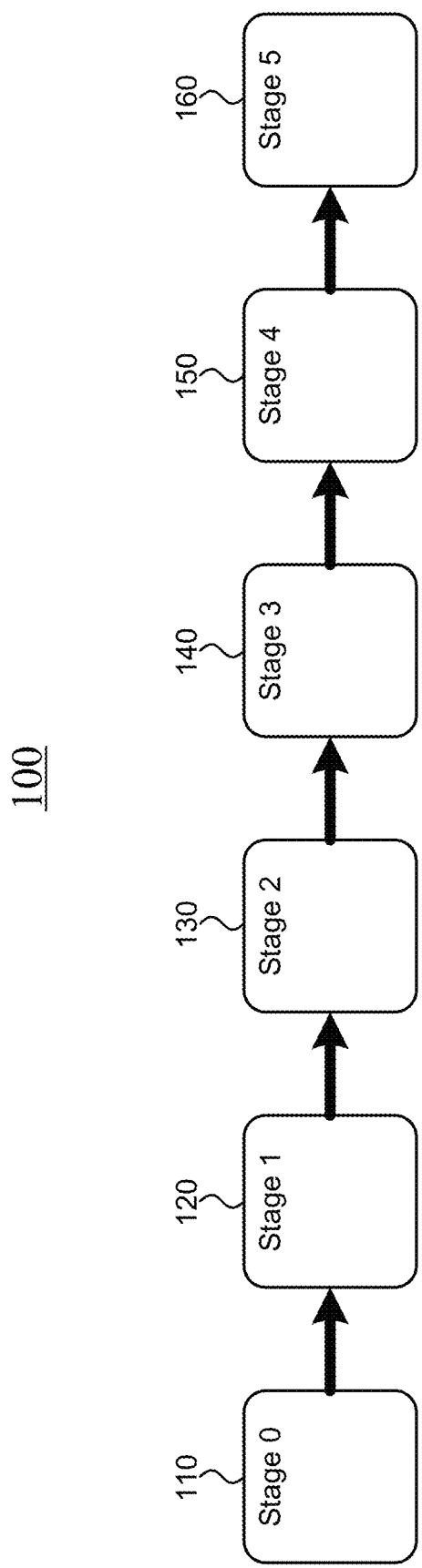
FIG. 1 illustrates an example pipeline architecture for an example processing system.

Embodiments of the present disclosure generally relate to integrated circuits including a configurable multi-stage pipeline. In some embodiments, the multiple stages of the pipeline may be connected by multiple layers of relatively small and simple switches, such as 2×2 switches. The multiple stages may include different circuits that are configured to perform different operations on received data blocks. The switches may operate to connect the multiple stages in a specified order based on information in the received data block to be processed by the pipeline, such that the connected multiple stages may process the received data blocks in a desired sequence. The switches may be placed and connected such that at least some of the connections among the switches and the multiple stages may be reused when processing a data block. The switches can be small (e.g., including a small number of inputs and outputs) and simple (easy to implement), and thus can simplify the physical implementation of the integrated circuit and can be implemented with less overhead compared to techniques using a N-to-N cross-connection. In some embodiments, the configurable pipeline may include additional circuits for managing the data processing by the multiple stages, such as ensuring that data blocks are processed in a desired order.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

As used herein, "connected" or "coupled" may include electrically connected or coupled, such as physically connected or coupled, directly connected or coupled, or indirectly connected or coupled. For example, two devices or circuits may be connected or coupled directly or indirectly through, for example, buffers, invertors, switches, multiplexers, wireless channels, etc., in addition to conducting wires. In some cases, some devices or circuits may be connectable in different configurations but may not necessarily be connected in a same configuration.

As used herein, two switches (or other interconnect circuits) are not on a same layer (i.e., the switches are on multiple layers) if an output of one switch is electrically connected to an input of the other switch without going through any processing stage or engine.

The performance of a processing system may be improved by using a parallel processing architecture, a multi-stage pipeline architecture, a multicore architecture, a hybrid pipeline and parallel architecture, etc. in the processing system. For example, in a network processor having a pipeline architecture, each packet may flow through the entire pipeline, where each stage of the pipeline may perform a part of the desired processing. In many cases, due to the long development time and long deployment period of an integrated circuit (IC) with a pipeline architecture, it is desirable that the IC can be reconfigured for many different applications, including future applications, such as new protocols, which may be difficult to predict.

An IC with a multi-stage pipeline typically has a fixed configuration going from one stage to the next, and may not allow repeating or looping in the pipeline. According to certain aspects of the present disclosure, a multi-stage pipeline may be configurable by connecting the multiple stages in a desired manner using configurable interconnects to support desired stage combinations for different applications, including possible future applications. In some cases, such interconnects may occupy a large real-estate area on the IC and may incur a large overhead. For example, in some implementations, for a N-stage pipeline, (N+1)×(N+1) long connections forming an (N+1)-to-(N+1) cross-connection may be used to connect the input of the pipeline to the input of any stage, connect the output of the pipeline to the output of any stage, and connect the input of any stage to the output of any stage. In some cases, the interconnects may pose a challenge for the physical implementation (e.g., layout and routing) due to excessive routing and logic used.

According to certain aspects of the present disclosure, a configurable pipeline may include one or more relatively small switches that allows better placement and routing for a complex IC with multiple processing stages or engines. The small switches may break up the long connection wires and may be configured such that some connection wires may be used more than once to configure a desired pipeline for a data block. The configurable pipeline may be dynamically configured to process a received data block based on information in the received data block. In some implementations, the configurable pipeline may also include additional circuits or processing stages for managing the data processing, such as the order in which multiple data blocks are processed.

FIG. 1 illustrates an example pipeline architecture for an example processing system 100. The pipeline of processing system 100 may have two ends, the input end and the output end. Between these two ends, there may be multiple stages, including a stage 0 (110), a stage 1 (120), a stage 2 (130), a stage 3 (140), a stage 4 (150), and a stage 5 (160). The output of one stage may be connected to the input of the next stage, and each stage may perform a specific operation. Interface registers (e.g., latches or buffers) may be used to hold operands and the intermediate output between two stages. In many implementations, all stages in the pipeline including the corresponding interface registers may be controlled by a common clock to function as a synchronous system.

In a processing system with a multi-stage pipeline architecture, such as processing system 100, simultaneous execution of more than one instruction or operation may take place. Each stage of the pipeline may perform different operations on a set of data, and the multiple stages may, in combination, perform all desired operations on the set of data (e.g., a network transport unit, such as a network packet, a frame, a message, or an encapsulated segment of data). Thus, the stages of the pipeline may operate sequentially on a same set of data, and may operate concurrently on different sets of data in the pipeline, rather than waiting for the processing of one set of data to complete before starting to process a different set of data. For example, a reduced instruction set computer (RISC) pipelined CPU may include an Instruction Fetch stage, an Instruction Decode stage, an Instruction Execute stage, a Memory Access stage, and a Write Back stage. In the Instruction Fetch stage, the CPU may read instructions from an address in a memory present in the program counter. In the Instruction Decode stage, the instruction may be decoded and a register file may be accessed to get the values from registers used in the instruction. In the Instruction Execute stage, arithmetic logic unit (ALU) operations may be performed. In the Memory Access stage, memory operands may be read from and/or written to the memory. In the Write Back stage, computed/fetched value may be written back to the register(s) present in the instruction. One reason for the pipeline architecture is that simple processing blocks may be able to run faster than complex ones. In addition, the overall throughput of the pipeline may be increased because of the concurrent processing at different stages.

In telecommunications networks, information (e.g., voice, video, data) is generally transferred as packets. The processing of these packets has led to the creation of network processors that are optimized to process packet data. A network processor may include an integrated circuit specifically targeted at networking applications to enhance and optimize packet processing within the telecommunication networks. Network processors can be used in many different types of network equipment, such as routers, switches, Ethernet controllers, firewalls, session border controllers, intrusion detection devices, intrusion prevention devices, and network monitoring systems.

A network processor may include a number of features or functions. For example, a network processor may be able to find specific patterns of bits or bytes within packets in a packet stream (pattern matching), look up a database using a key (e.g., an address in a packet) to find a result (e.g., routing information) (key lookup), and/or change certain data fields in the packet as it is being processed (data field manipulation). A network processor may also be configured to perform operations such as computation, queue management, processing control and orchestration, allocation and re-circulation of packet buffers, packet or frame discrimination and forwarding, and quality of service (QoS) enforcement (identifying different types or classes of packets and providing preferential treatment for some types or classes of packets at the expense of other types or classes of packets). Some network processors may also perform access control functions to determine whether a specific packet or stream of packets should be allowed to traverse a piece of network equipment. Some network processors may include built-in hardware-based encryption engines that allow individual data flows to be encrypted by the network processors. Some network processors may perform operations, such as digital signature, data compression, cyclic redundancy check (CRC), etc.

In order to provide the desired processing performance, a network processor may include one or more task-customized processors (rather than generic RISC processors). Each processor of the one or more task-customized processors may be tailored to perform a specific networking operation as described above. Task-customized processors may be much more compact than the generic processors. Moreover, the instruction set used to perform the functions of each individual processor may be a small portion (e.g., less than 10%) of the instruction set for RISC processors. In addition to the optimization of the instruction set, the data path within each task-customized processor may also be tailored to the particular networking operations (or features) of the task-customized processor. Hence, a network processor may include two or more task-customized processors in a multi-stage pipeline, where each task-customized processor may have a specialized data path and a specialized instruction set. Consequently, the packet processing at each stage may be performed faster using a task-customized processor that is more compact and takes up less silicon area on the chip.

These fast and efficient processors may be integrated in a super-scalar architecture that is designed and optimized for packet-processing tasks.

In one example, a network processor may include a multi-stage pipeline structure as shown in processing system 100. Stage 0 (110) may include a link controller, and stage 2 (120) may be a parsing stage. Data packets may be transferred to parsing stage 1 (120) from the link controller of stage 0 (110). In parsing stage 1 (120), the packet header(s) and the payload may be separated, and the contents of the packet header(s) and the fields of the packet headers may be extracted and analyzed. The parsing stage 1 (120) may be capable of handling different OSI packet layers including payload fields with dynamic offsets and length.

Stage 2 (130) may be a searching stage. Searching stage 2 (130) may receive search keys, which may be the fields extracted by parsing stage 1 (120), and then perform various table look-ups required, for example, for layer 2 switching, layer 3 routing, layer 4 session switching, and layers 5-7 content switching and policy enforcement. In some implementations, searching stage 2 (130) may need to access memory to acquire the look-up tables and store the look-up tables in a local memory (e.g., a cache).

After the various search and match operations have been completed, searching stage 2 (130) may forward the search results to stage 3 (140), which may be a resolution stage. Resolution stage 3 (140) may make the decision for packet handling. For example, in resolution stage 3 (140), a packet may be assigned to an appropriate output port via a queue and/or a switch matrix, packet history information may be stored, and content changes may be decided.

The packet may then be conveyed to stage 4 (150), which may be a modification stage that may modify the packet (e.g. overwrite, remove, or insert certain fields within the packet) if needed. The modified packet may be sent to stage 5 (160), which may forward the packet to the appropriate output port via the queue and/or the switch matrix.

In one example, an Ethernet controller may include a multi-stage pipeline structure as shown in processing system 100. The multi-stage pipeline may include, for example, an encryption stage, a digital signature stage, a data compression stage, and a CRC stage.

The multi-stage pipeline of processing system 100 may process data in one direction from stage 0 to stage 5. Such configuration may be suitable for some applications, but may not be suitable for some other applications that perform data processing in different orders or perform different data processing operations. For example, in some applications, it may be desirable that the data processing performed by some stages of stages 0-5 of processing system 100 may not be used. In some applications, it may be desirable that the data processing performed by, for example, stage 4, may be performed before, for example, the data processing performed by stage 1, 2, or 3. In some applications, it may be desirable that the data processing performed by some stages of stages 0-5 may be performed more than once for a same set of data. For example, it may be desirable that the data processing to be performed on a data packet may be performed by stages 0-5 according to a sequence of stage 0, stage 1, stage 2, stage 3, stage 1, stage 2, stage 3, stage 4, and stage 5. The fixed sequence in processing system 100 may not be suitable for these applications even though a different configuration (e.g., connection) of stages 0-5 can be able to handle these applications.

In order to support desired stage combinations for different applications, including possible future applications, the stages of a multi-stage pipeline may be connected using, for example, switches, multiplexers, demultiplexers, or other switching circuits. The switching circuits may be controlled based on the desired order of processing for the data blocks to connect the stages in desired manners.

Figure 2:
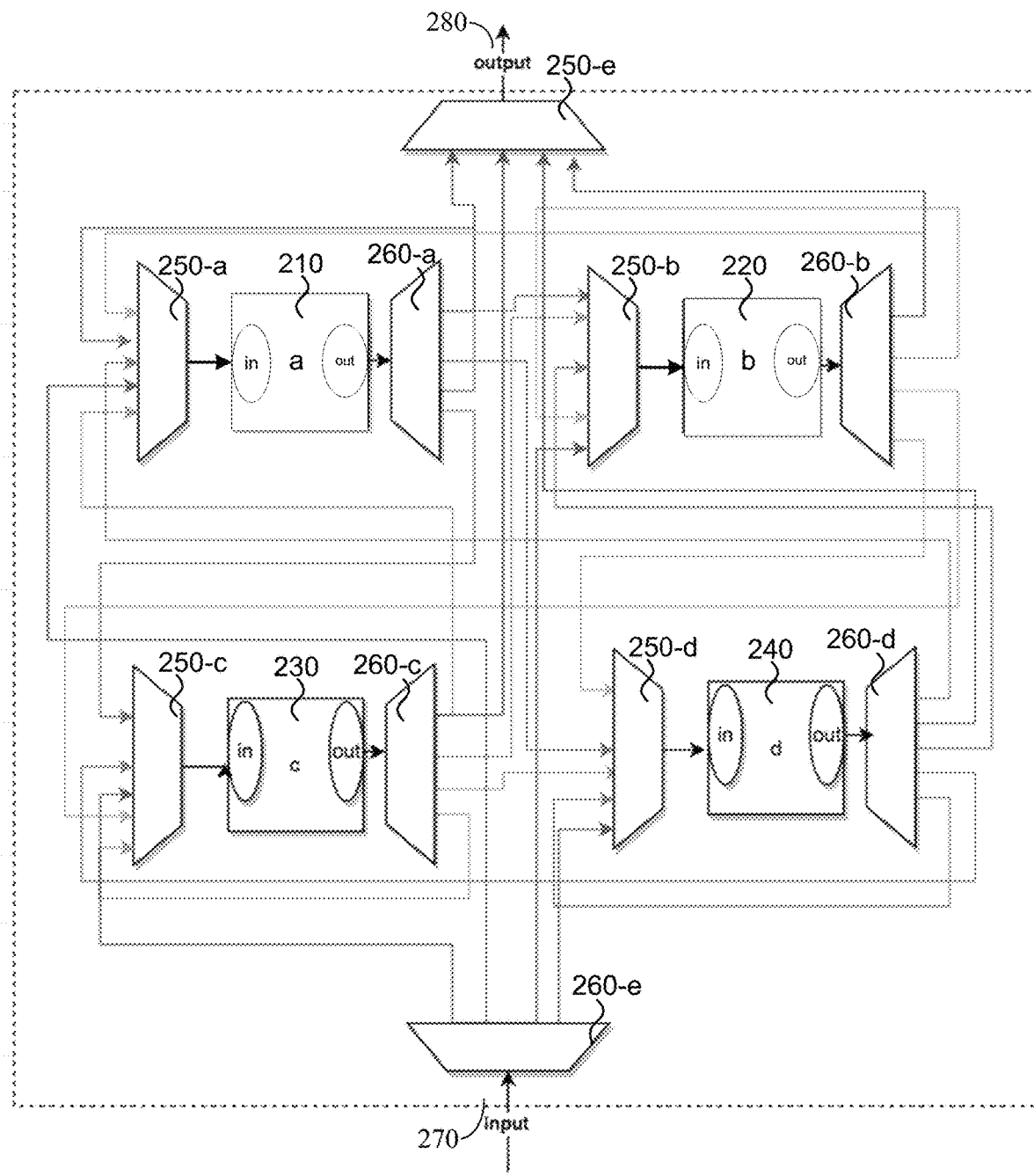
FIG. 2 illustrates an example configurable pipeline, according to certain embodiments.

FIG. 2 illustrates an example configurable pipeline 200. Configurable pipeline 200 may include an input 270, an output 280, and four processing stages (or engines)—stage a (210), stage b (220), stage c (230), stage d (240). Each of the four processing stages may include different circuits configured to perform a different data processing function. Each processing stage may include an input port and an output port. The input port of each processing stage may be connected to a multiplexer (250-a, 250-b, 250-c, 250-d) or a N-to-1 switch (where N is 5 in the example shown in FIG. 2). Each multiplexer may include multiple (e.g., 5) input ports and one output port. The output port of each multiplexer may be connected to the input port of a corresponding processing stage. The input ports of each of the multiplexer may be connected to the output ports of the four processing stages and input 270 of configurable pipeline 200, through demultiplexers 260-a, 260-b, 260-c, 260-d, and 260-e (collectively demultiplexers 260). The output port of each processing stage may be connected to a demultiplexer (260-a, 260-b, 260-c, 260-d) or a 1-to-N switch. Each demultiplexer may include multiple (e.g., 5) output ports and one input port. The input port of each multiplexer may be connected to the output port of the corresponding processing stage. The output ports of each demultiplexer may be coupled to the input ports of the four processing stages and output 280 of configurable pipeline 200, through one of multiplexers 250-a, 250-b, 250-c, 250-d, and 250-e (collectively multiplexers 250). In this way, each processing stage can take input from the output port of any of the four processing stages and input 270, and can send output data to the input port of any of the four processing stages and output 280. Therefore, different combinations of the four processing stages, and thus different configurations of configurable pipeline 200, may be possible by setting multiplexers 250 and demultiplexers 260 in different manners.

For example, configurable pipeline 200 may be configured such that an input data block from input 270 may be processed by stage a (210), stage c (230), stage d (240), and stage b (220), and the final processing results may be sent to output 280. This may be accomplished by setting demultiplexer 260-e to send the input data block to the corresponding input port of multiplexer 250-a, setting multiplexer 250-a to connect the corresponding input to the input port of processing stage a (210), setting demultiplexer 260-a to connect the output port of processing stage a (210) to a corresponding output port of demultiplexer 260-a that connects to multiplexer 250-c, setting multiplexer 250-c to connect the input port of multiplexer 250-c that connects to demultiplexer 260-a to the input port of processing stage c (230), setting demultiplexer 260-c to connect the output port of processing stage c (230) to a corresponding output port of demultiplexer 260-c that connects to multiplexer 250-d, setting multiplexer 250-d to connect the input port of multiplexer 250-d that connects to demultiplexer 260-c to the input port of processing stage d (240), setting demultiplexer 260-d to connect the output port of processing stage d (240) to a corresponding output port of demultiplexer 260-d that connects to multiplexer 250-b, setting multiplexer 250-b to connect the input port of multiplexer 250-b that connects to demultiplexer 260-d to the input port of processing stage b (220), setting demultiplexer 260-b to connect the output port of processing stage b (220) to a corresponding output port of demultiplexer 260-b that connects to multiplexer 250-*e*, and setting multiplexer 250-*e* to connect the input port of multiplexer 250-*e* that connects to demultiplexer 260-*b* to output 280 of configurable pipeline 200.

In another example, configurable pipeline 200 may be configured by setting multiplexers 250 and demultiplexers 260 such that an input data block from input 270 may be processed by stage a (210), stage c (230), stage d (240), stage c (230), stage d (240), and stage b (220), and the final processing results may be sent to output 280. In yet another example, configurable pipeline 200 may be configured by setting multiplexers 250 and demultiplexers 260 such that an input data block from input 270 may be processed by stage a (210) and stage b (220), and the final processing results may then be sent to output 280.

As shown in FIG. 2, the example four-stage configurable pipeline 200 may use five multiplexers, five demultiplexers, and many interconnections (e.g., wires) to form a single-layer 5-to-5 cross-connection. The interconnects using these switching circuits and wires may be complex, and may occupy a large real-estate area on the IC and incur a large overhead. In addition, there may be many crossings of the connection wires, which may require many wires to be routed on different interconnect layers (e.g., metal layers). In some cases, the complex interconnects for connecting the stages may make it difficult for placement and route the configurable pipeline due to excessive routing wires and logic circuits used.

Figure 3:
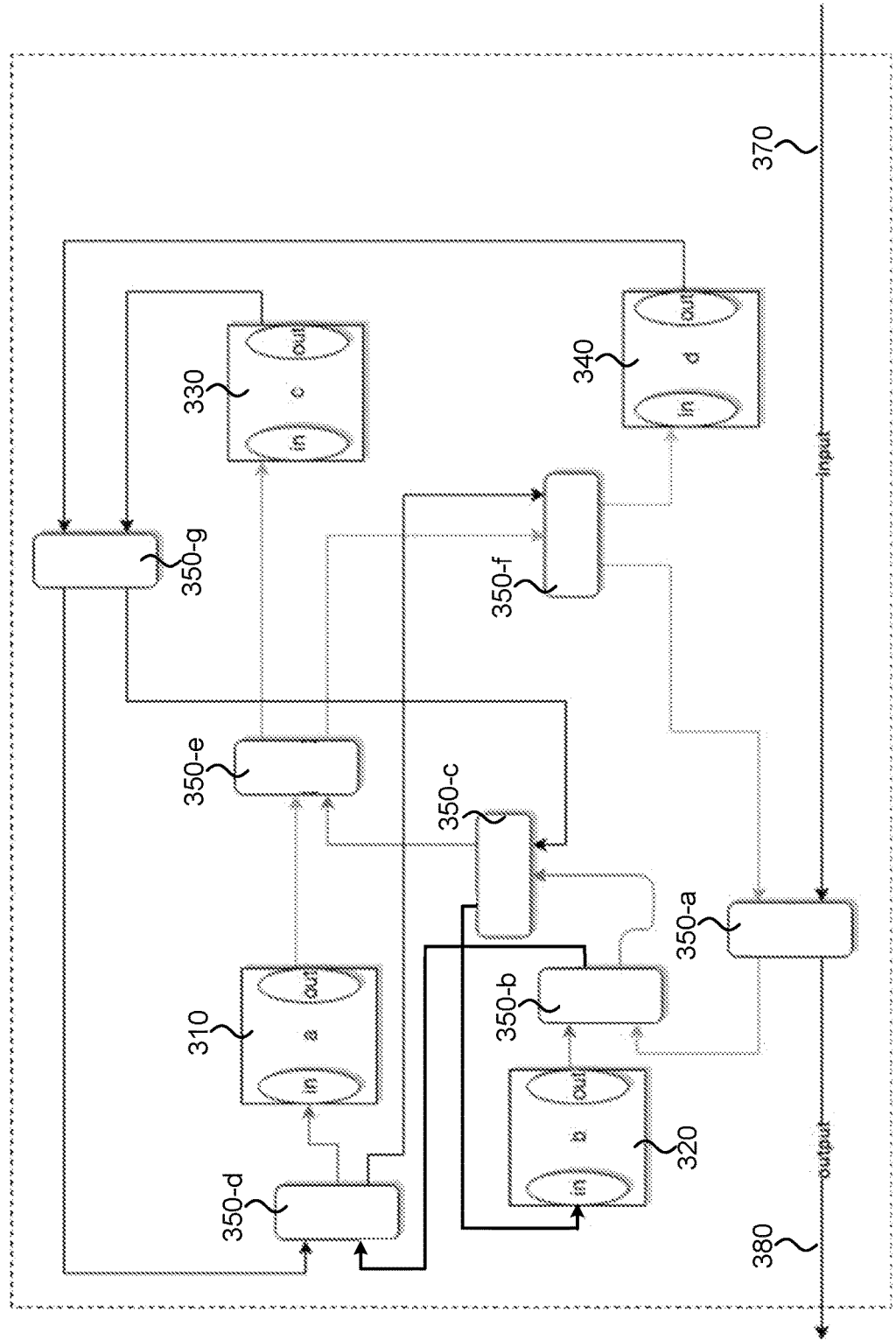
FIG. 3 illustrates an example configurable pipeline, according to certain embodiments.

FIG. 3 illustrates an example configurable pipeline 300, according to certain embodiments. Configurable pipeline 300 may include an input 370, an output 380, and four processing stages (or engines)—stage a (310), stage b (320), stage c (330), staged (340). Each of the four processing stages may perform a different data processing function, such as, for example, data encryption, digital signature, data compression, cyclic redundancy check, etc. Each processing stage may include an input port and an output port. The input port of each processing stage may be connected to an output port of a 2×2 switch (e.g., switch 350-*c*, 350-*d*, 350-*e*, or 350-*f*), and the output port of each processing stage may be connected to an input port of a 2×2 switch (e.g., switch 350-*e*, 350-*b*, or 350-*g*). Each 2×2 switch may include two input ports and two output ports, where the 2×2 switch may be configurable to connect any one of the two input ports to any one of the two output ports. In some implementations, each of the switches may also include a memory or a buffer, such as a first-in first-out (FIFO) buffer. By configuring the 2×2 switches 350-*a* to 350-*g*, different combinations of the four processing stages, and thus different configurations of configurable pipeline 200, can be achieved.

For example, to process an input data block from input 270 by stage a (310), stage b (320), stage c (330), and stage d (340), and send the final processing results to output 380, configurable pipeline 300 may be configured by setting switches 350-*a* to 350-*g* such that input 370 may be connected the input port of stage a (310) through, for example, switches 350-*a*, 350-*b*, and 350-*d*. The output port of stage a (310) may be connected to the input port of stage b (320) through, for example, switches 350-*e*, 350-*f*, 350-*a*, 350-*b*, and 350-*c*. The output port of stage b (320) may be connected to the input port of stage c (330) through, for example, switches 350-*b*, 350-*c*, and 350-*e*. The output port of stage c (330) may be connected to the input port of staged (340) through, for example, switches 350-*g*, 350-*c*, 350-*e*, and 350-*f*. The output port of stage d (340) may be connected to output 380 through, for example, switches 350-*g*, 350-*d*, 350-*f*, and 350-*a*.

In another example, to process an input data block from input 270 by stage a (310), stage b (320), stage c (330), stage b (320), stage c (330), and stage d (340), and then send the final processing results to output 380, configurable pipeline 300 may be configured by setting switches 350-*a* to 350-*g* such that input 370 may be connected to the input port of stage a (310) through, for example, switches 350-*a*, 350-*b*, and 350-*d*. The output port of stage a (310) may be connected to the input port of stage b (320) through, for example, switches 350-*e*, 350-*f*, 350-*a*, 350-*b* and 350-*b*. The output port of stage b (320) may be connected to the input port of stage c (330) through, for example, switches 350-*b*, 350-*c*, and 350-*e*. The output port of stage c (330) may be connected to the input port of stage b (320) through, for example, switches 350-*g*, and 350-*c*. The output port of stage b (320) may be connected to the input port of stage c (330) through, for example, switches 350-*b*, 350-*c*, and 350-*e*. The output port of stage c (330) may be connected to the input port of stage d (340) through, for example, switches 350-*g*, 350-*d*, and 350-*f*. The output port of staged (340) may be connected to the output 380 through, for example, switches 350-*g*, 350-*d*, 350-*f*, and 350-*a*.

As shown in FIG. 3, seven relatively simple and small 2×2 switches may be used to configure configurable pipeline 300 to process an input data block in a desired processing sequence. The connections among the processing stages and the switches are much less than the connections in FIG. 2, and less crossings of the connections may occur. Thus, the interconnects in FIG. 3 may occupy less area on the IC, and the physical implementation (e.g., placement, layout, and routing) of the interconnects may be easier. It is noted that the time delay between the processing stages may be increased slightly, which may affect the latency of the data processing using configurable pipeline 300 but may have little or no effect on the overall throughput of configurable pipeline 300.

Figure 4:
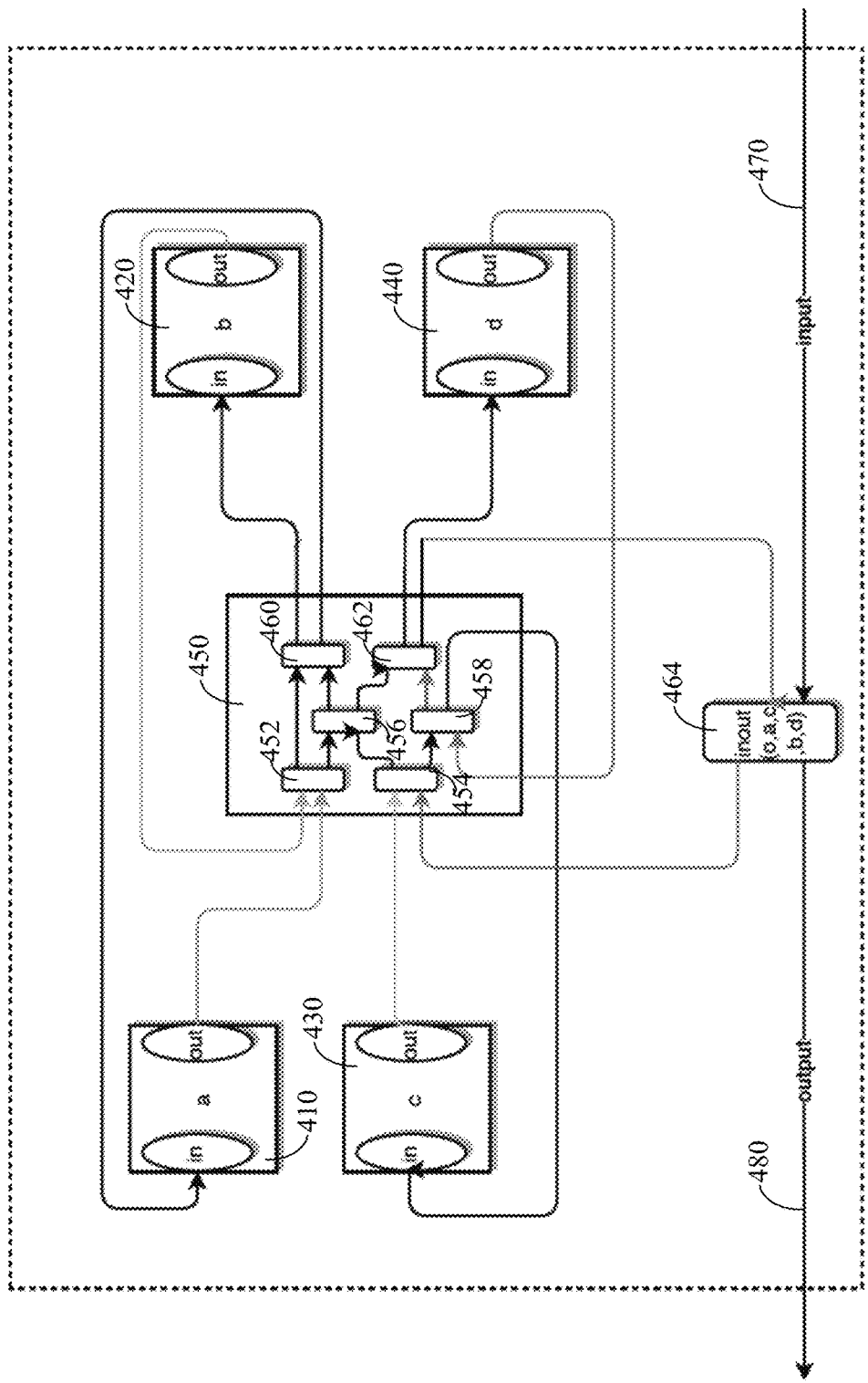
FIG. 4 illustrates an example configurable pipeline, according to certain embodiments.

FIG. 4 illustrates another example configurable pipeline 400, according to certain embodiments. Configurable pipeline 400 may include an input 470, an output 480, and four processing stages (or engines)—stage a (410), stage b (420), stage c (430), stage d (440). Each of the four processing stages may perform a different data processing function, such as data encryption, digital signature, data compression, cyclic redundancy check, etc. Each processing stage may include an input port and an output port. The input port of each processing stage may be connected to an output port of a switch 450, and the output port of each processing stage may be connected to an input port of switch 450. Switch 450 may include five input ports, five output ports, and six 2×2 switches 452, 454, 456, 458, 460, and 462. Input 470 and output 480 may be connected to an input port and an output port of switch 450, respectively, through a 2×2 switch 464. By configuring 2×2 switch 464 and switch 450 in different manners, different combinations of the four processing stages, and thus different configurations of configurable pipeline 400, may be achieved.

For example, to process an input data block from input 470 by stage a (410), stage b (420), stage c (430), and stage d (440), and send the final processing results to output 480, configurable pipeline 400, more specifically, switches 464 and 450, may be configured such that input 470 may be connected to the input port of stage a (410) through, for example, switches 464, 454, 456, and 460. The output port of stage a (410) may be connected to the input port of stage b (420) through, for example, switches 452 and 460. The output port of stage b (420) may be connected to the input port of stage c (430) through, for example, switches 452, 456, 462, 464, 454, and 458. The output port of stage c (430) may be connected to the input port of stage d (440) through, for example, switches 454, 456 (or 458), and 462. The output port of stage d (440) may be connected to output 480 through, for example, switches 458, 462, and 464.

As another example, to process an input data block from input 470 by stage c (430) and stage b (420), and send the final processing results to output 480, configurable pipeline 400 (more specifically, switches 464 and 450) may be configured such that input 470 may be connected to the input port of stage c (430) through, for example, switches 464, 454, and 458. The output port of stage c (430) may be connected to the input port of stage b (420) through, for example, switches 454, 456, and 460. The output port of stage b (420) may be connected to output 480 through, for example, switches 452, 456, 462, and 464.

As shown in FIG. 4, a N×M switch (where at least one of N or M may be greater than 2) may be used to configure configurable pipeline 400 to process an input data block in a desired processing sequence. The N×M switch may be constructed using multiple layers of 2×2 switches. The connections among the processing stages and the switches are much less than the connections in FIG. 2, and less crossings of the connections may occur. Thus, the interconnects in FIG. 4 may occupy less area on the IC, and the physical implementation (e.g., placement, layout, and routing) of the interconnects may be easier.

Figure 5A:
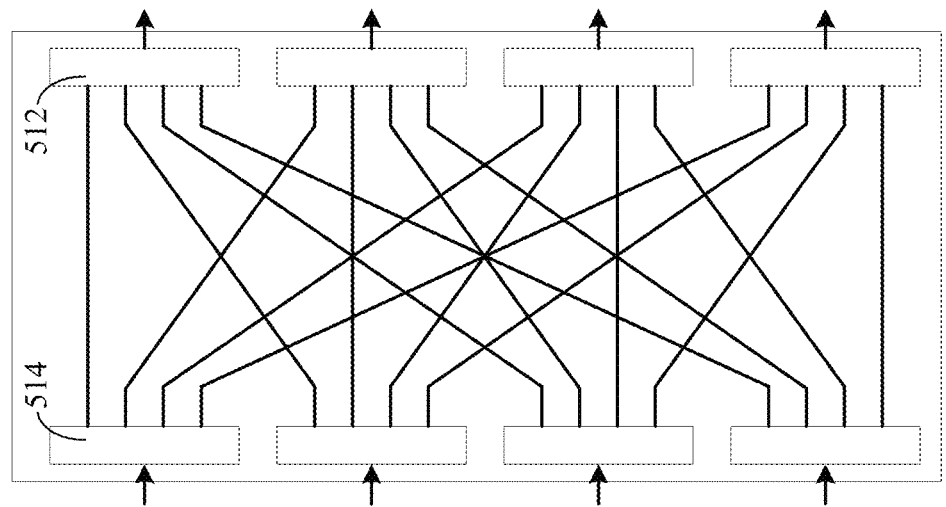
FIG. 5A illustrates an example 4×4 cross-connection for implementing a configurable pipeline, according to certain embodiments.

FIG. 5A illustrates an example 4×4 cross-connection 510 for implementing a configurable pipeline, according to certain embodiments. Cross-connection 510 may represent the interconnect configuration shown in FIG. 2. Cross-connection 510 may include 4 multiplexers 512, 4 demultiplexers 514, and 16 internal connections, where the output of each multiplexer 512 may be connected to the input port of a processing stage, and the input of each demultiplexer 514 may be connected to the output port of a processing stage. Thus, no output of any multiplexer 512 is electrically connected to the input of any demultiplexer 514 without going through a processing stage or engine.

Figure 5B:
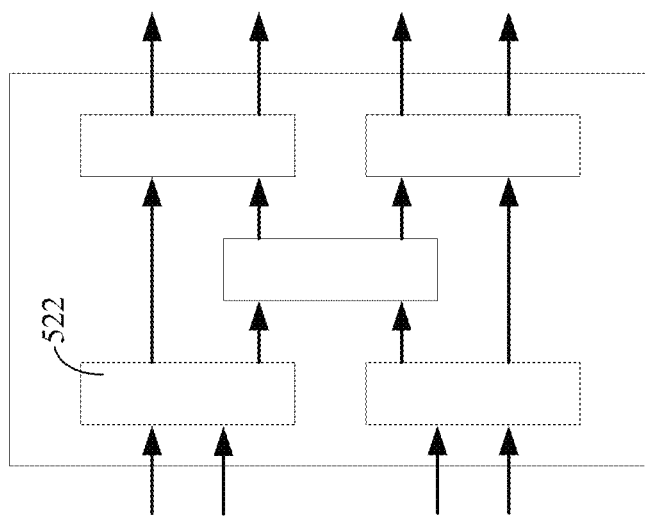
FIG. 5B illustrates an example 4×4 switch for implementing a configurable pipeline, according to certain embodiments.
Figure 5C:
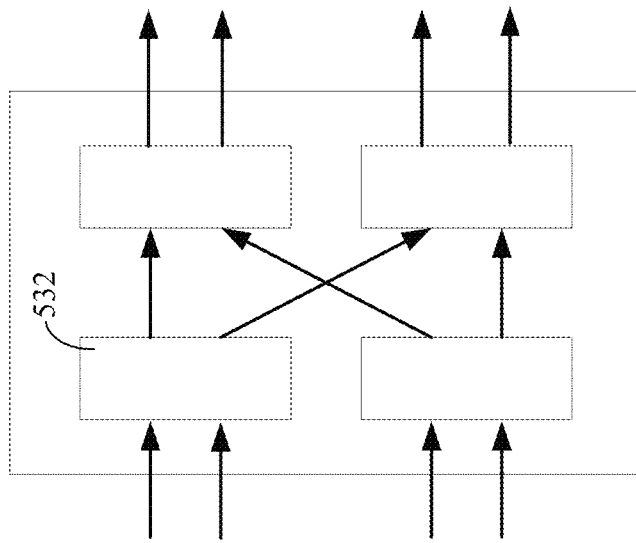
FIG. 5C illustrates another example 4×4 switch for implementing a configurable pipeline, according to certain embodiments.

FIG. 5B illustrates an example 4×4 switch 520 for implementing a configurable pipeline, according to certain embodiments. FIG. 5C illustrates another example 4×4 switch 530 for implementing a configurable pipeline, according to certain embodiments. Switches 520 and 530 may be used to implement the interconnect configuration shown in, for example, FIG. 4. Switch 520 may be formed using five 2×2 switches 522 and 6 internal connections to achieve a 4-to-4 cross-connection. Switch 530 may be formed using four 2×2 switches 532 and four internal connection wires to achieve a 4-to-4 cross-connection. In contrast, in the configuration shown in FIG. 5A, to make a 4-to-4 cross-connection 510, four 1-to-4 demultiplexer, four 4-to-1 multiplexers, and 16 connection wires may be used. Thus, the number of logic devices and wires used to achieve a cross-connection may be significantly reduced using the configuration shown in FIGS. 5B and 5C.

Figure 6A:
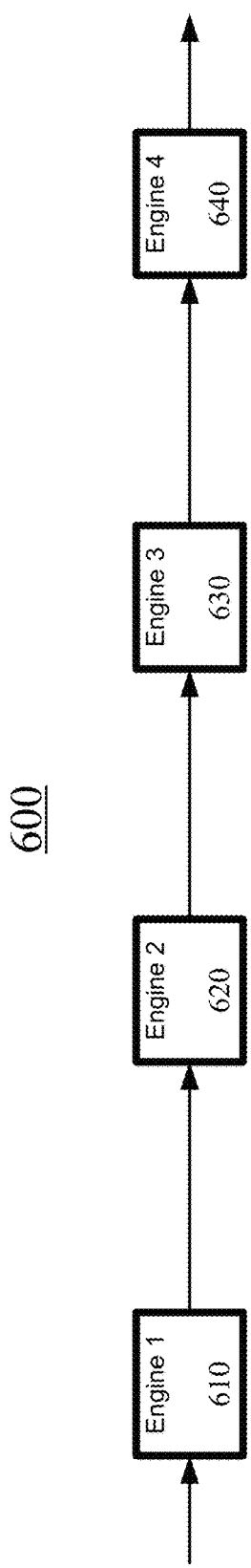
FIG. 6A illustrates multiple processing engines in a pipeline.

FIG. 6A illustrates multiple processing engines in a pipeline 600. In the example, pipeline 600 may include 4 processing engines—engine 1 (610), engine 2 (620), engine 3 (630), and engine 4 (640). Each of the four processing engines may perform a different data processing function, such as data encryption, digital signature, data compression, cyclic redundancy check, etc. The four processing engines may be connected in the sequence of engine 1 (610), engine 2 (620), engine 3 (630), and engine 4 (640). Data input to pipeline 600 may be sent to the input port of engine 1 (610). Data output from pipeline 600 may be sent out from the output port of engine 4 (640).

Figure 6B:
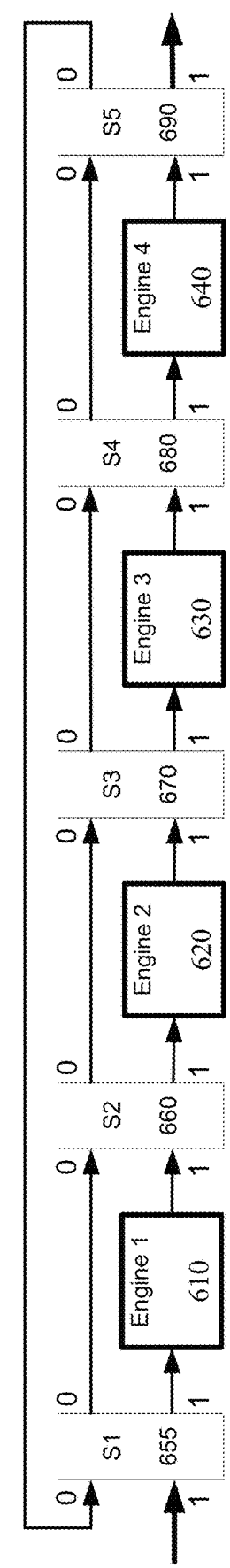
FIG. 6B illustrates an example configurable pipeline using 2×2 switches, according to certain embodiments.

FIG. 6B illustrates an example configurable pipeline 650 using 2×2 switches, according to certain embodiments. Configurable pipeline 650 may be constructed based on pipeline 600 by adding five 2×2 switches. Switch S1 (655) may be added between the data input of configurable pipeline 650 and the input port of engine 1 (610). Switch S2 (660) may be added between the output port of engine 1 (610) and the input port of engine 2 (620). Similarly, switch S3 (670) may be added between the output port of engine 2 (620) and the input port of engine 3 (630), and switch S4 (680) may be added between the output port of engine 3 (630) and the input port of engine 4 (640). Switch S5 (690) may be added between the output port of engine 4 (640) and input port 0 of switch S1 (655). Input port 1 of switch S1 (655) may be connected to the data input of configurable pipeline 650, output port 0 of switch S1 (655) may be connected to input port 0 of switch S2 (660), and output port 1 of switch S1 (655) may be connected to the input port of engine 1 (610). Input port 1 of switch S2 (660) may be connected to the output port of engine 1 (610), output port 0 of switch S2 (660) may be connected to input port 0 of switch S3 (670), and output port 1 of switch S2 (660) may be connected to the input port of engine 2 (620). Input port 1 of switch S3 (670) may be connected to the output port of engine 2 (620), output port 0 of switch S3 (670) may be connected to input port 0 of switch S4 (680), and output port 1 of switch S3 (670) may be connected to the input port of engine 3 (630). Input port 1 of switch S4 (680) may be connected to the output port of engine 3 (630), output port 0 of switch S4 (680) may be connected to input port 0 of switch S5 (690), and output port 1 of switch S4 (680) may be connected to the input port of engine 4 (640). Input port 1 of switch S5 (690) may be connected to the output port of engine 4 (640), output port 0 of switch S5 (690) may be connected to input port 0 of switch S1 (655), and output port 1 of switch S5 (690) may be connected to the data output of configurable pipeline 650.

FIG. 7 illustrates an example configuration of the configurable pipeline 650 shown in FIG. 6B, according to certain embodiments. In the example shown in FIG. 7, to configure configurable pipeline 650 to process a data block in the order of engine 1, engine 2, engine 3, engine 4, engine 4, engine 3, and engine 4, switch S1 may first be configured such that input port 1 of switch S1 (which is connected to the data input of configurable pipeline 650) is connected to output port 1 of switch S1 (which is connected to the input port of engine 1). Switch S2 may then be configured such that input port 1 of switch S2 (which is connected to the output port of engine 1) is connected to output port 1 of switch S2 (which is connected to the input port of engine 2). Switch S3 may then be configured such that input port 1 of switch S3 (which is connected to the output port of engine 2) is connected to output port 1 of switch S3 (which is connected to the input port of engine 3). Switch S4 may then be configured such that input port 1 of switch S4 (which is connected to the output port of engine 3) is connected to output port 1 of switch S4 (which is connected to the input port of engine 4). Switch S5 may then be configured such that input port 1 of switch S5 (which is connected to the output port of engine 4) is connected to output port 0 of switch S5 (which is connected to input port 0 of switch S1).

Next, switch S1 may be configured such that input port 0 of switch is connected to output port 0 of switch S1 (which is connected to input port 0 of switch S2). Switch S2 may then be configured such that input port 0 of switch S2 is connected to output port 0 of switch S2 (which is connected to input port 0 of switch S3). Switch S3 may be configured such that input port 0 of switch S3 is connected to output port 0 of switch S3 (which is connected to input port 0 of switch S4). Switch S4 may then be configured such that input port 0 of switch S4 is connected to output port 1 of switch S4 (which is connected to input port of engine 4). Switch S5 may then be configured such that input port 1 of switch S5 (which is connected to the output port of engine 4) is connected to output port 0 of switch S5 (which is connected to input port 0 of switch S1).

Subsequently, switch S1 may be configured such that input port 0 of switch S1 is connected to output port 0 of switch S1 (which is connected to input port 0 of switch S2). Switch S2 may then be configured such that input port 0 of switch S2 is connected to output port 0 of switch S2 (which is connected to the input port 0 of switch S3). Switch S3 may be configured such that input port 0 of switch S3 is connected to output port 1 of switch S3 (which is connected to the input port of engine 3). Switch S4 may then be configured such that input port 1 of switch S4 (which is connected to the output port of engine 4) is connected to output port 1 of switch S4 (which is connected to the input port of engine 4). Switch S5 may be configured such that input port 1 of switch S5, (which is connected to the output port of engine 4) is connected to output port 1 of switch S5, which is connected to the output of configurable pipeline 650.

The sequence of routing by the switches shown in FIG. 7 may be included in each received data block, such as in the metadata associated with the data block or in a header of a data packet in the received data block. In some implementations, such routing information may be determined by software. For example, when a network transmitter of, for example, an Ethernet controller, uses a configurable pipeline described above, the routing information may be determined by a co-processing software. When a network receiver of, for example, an Ethernet controller, uses a configurable pipeline described above, the routing information may be determined by a protocol parser.

Figure 8:
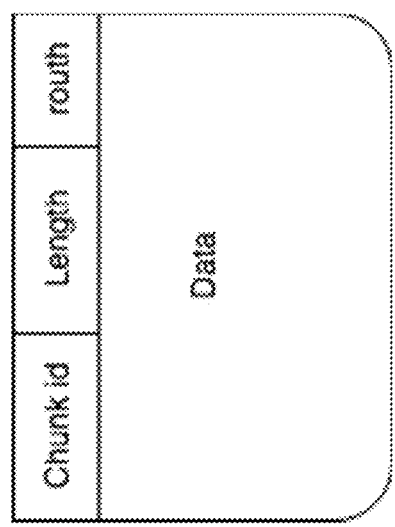
FIG. 8 is a simplified data structure of a data packet to be processed by a configurable processing circuit, according to certain embodiments.

FIG. 8 is a simplified data structure of a data packet 800 to be processed by a configurable processing circuit, according to certain embodiments. Data packet 800 may include a header, which may include an optional chunk identification (ID) for identifying the data packet in case the data packet is processed or transmitted out of order. For example, the chunk ID may include a packet ID for a data packet. The header may optionally include a length field, which may indicate the length of the payload data in the packet. In a fixed packet size system or protocol, the length field may not be used. The header may include a routh field, which may include the routing information or information for configuring the switches as shown in FIG. 7.

The above described embodiments of configurable multi-stage pipelines may use simple switches (e.g., 2×2 switches) and may reuse at least some of the switches and connections for processing a data block, and thus may use fewer connections and have fewer crossings in the connections. Therefore, the interconnects between the processing stages may occupy less area on the IC, and the physical implementation of the interconnects may be much easier.

The above described embodiments of configurable multi-stage pipelines may allow any combination of the multiple processing stages, including using one or more processing stages more than one time for a data block, connecting the multiple processing stages in different orders, omitting one or more processing stages, etc. For example, a configurable multi-stage pipeline may be used to process a data packet for different network layers. One example of a configurable multi-stage pipeline may include at least three processing engines configured to perform data encryption, digital signature, and CRC, respectively. The three processing engines may be used to perform data encryption, digital signature, and CRC for a layer 3 packet, and then perform data encryption, digital signature, and CRC for a layer 2 packet. In some implementations, the three processing engines may be used to perform digital signature, data encryption, and CRC.

The above described embodiments of configurable multi-stage pipelines may be easily scalable. For example, as shown in FIG. 6B, when an additional processing stage is added, one additional 2×2 switch may be added to allow for any combination of the multiple processing stages. In some implementations, one or more switches can also be used as buffers to facilitate the various combinations of the processing stages.

In some cases, different data blocks may use a same configuration of the pipeline. In some cases, different data blocks may use different configurations of the pipeline. For example, one data block may be processed by engine 1 first and then processed by engine 2, while a next data block may be processed by engine 2 first and then processed by engine 1. In another example, two different data blocks may be processed by the processing engines on two different paths, and thus may exit the pipeline in an order that is different from the order that they enter the pipeline. In some cases, the data blocks may have different sizes, and thus may require different processing time periods. For example, a large data block may be processed by a processing engine for a long period of time, and thus may block the processing paths for other data blocks. In some implementations, additional circuits may be added to the configurable pipeline to manage the data processing in these circumstances. For example, some additional circuits may be added before, after, or within the switches.

Figure 9:
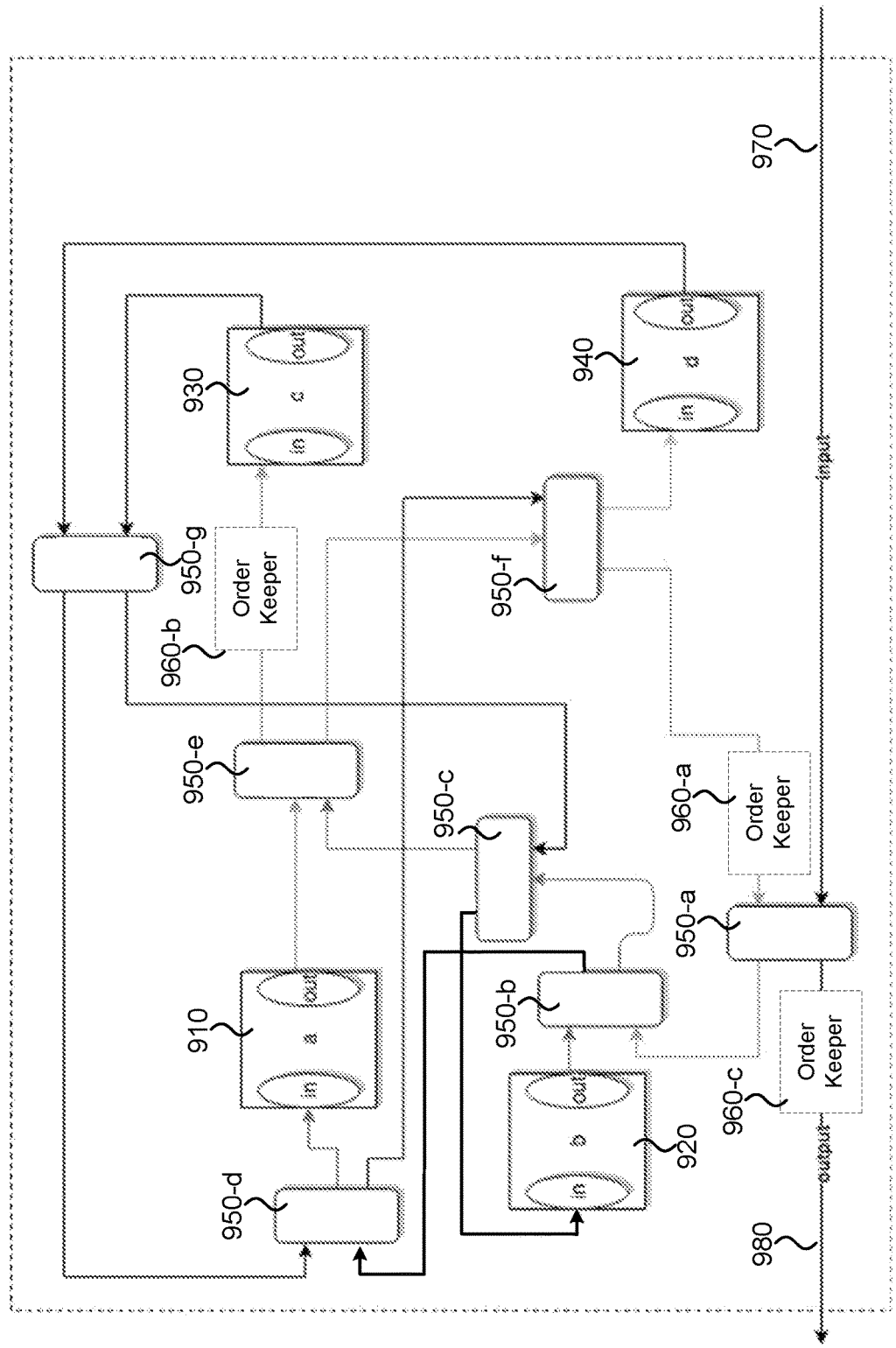
FIG. 9 illustrates an example configurable pipeline including order-keeping circuits, according to certain embodiments.

FIG. 9 illustrates an example configurable pipeline 900 including order-keeping circuits, according to certain embodiments. Configurable pipeline 900 may be similar to configurable pipeline 300. Configurable pipeline 900 may include an input 970, an output 980, and four processing stages (or engines)—stage a (910), stage b (920), stage c (930), stage d (940). Each of the four processing stages may perform a different data processing function, such as data encryption, digital signature, data compression, cyclic redundancy check, etc. Each processing stage may include an input port and an output port. The input port of each processing stage may be connected to an output port of a 2×2 switch (e.g., switch 950-*c*, 950-*d*, 950-*e*, or 950-*f*), and the output port of each processing stage may be connected to an input port of a 2×2 switch (e.g., switch 950-*e*, 950-*b*, or 950-*g*). Each 2×2 switch may include two input ports and two output ports, where the 2×2 switch may be configurable to connect any one of the two input ports to any one of the two output ports. Thus, by configuring 2×2 switches 950-*a* to 950-*g* in different manners, different combinations of the four processing stages, and thus different configurations of configurable pipeline 200, may be achieved.

At various locations in configurable pipeline 900, one or more order-keeping circuits, such as order keepers 960-*a*, 960-*b*, and 960-*c*, may be added. The order keepers may be added at the input of configurable pipeline 900, between two processing stages, at an input port of a processing stage or switch, at an output port of a processing stage or switch, within a switch, or at the output of configurable pipeline 900. In some implementations, an order-keeping circuit may be included in the configurable pipeline as a processing stage, and may be coupled to other processing stages through the switches and interconnects and may be reused in the pipeline, just like other processing stages of the configurable pipeline.

Figure 10:
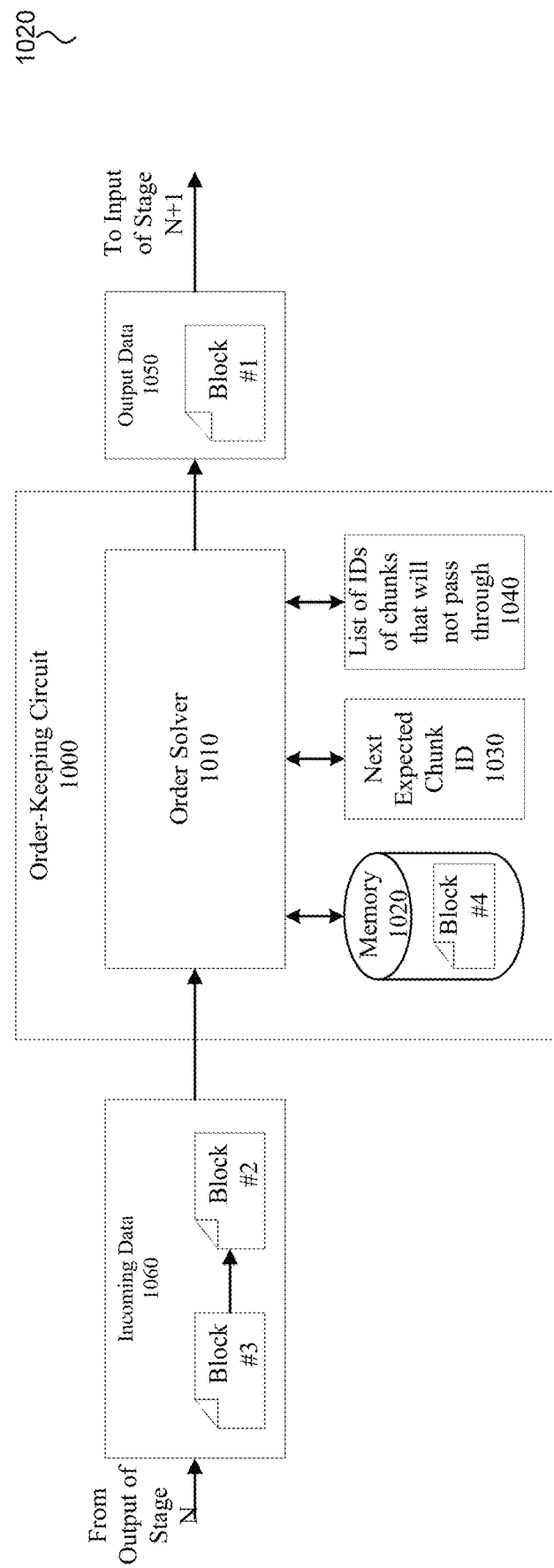
FIG. 10 is a simplified block diagram of an order-keeping circuit, according to certain embodiments.

FIG. 10 is a simplified block diagram of an example order-keeping circuit (i.e., order keeper) 1000, such as order keeper 960-a, 960-b, or 960-c, according to certain embodiments. Order-keeping circuit 1000 may include an order solver logic 1010 that may help to reorder the data blocks to ensure that the data blocks are processed in a desired order. Order-keeping circuit 1000 may also include an optional memory block 1020, a circuit 1030 for keeping track of the next expected chunk ID, and a circuit 1040 (e.g., a memory block) for keeping a list of IDs of data blocks that will not be processed by the next processing stage. Order-keeping circuit 1000 may receive incoming data 1060 from a previous processing stage (e.g., stage N) in the pipeline, and may send output data 1050 to the next processing stage (e.g., stage N+1). Memory block 1020 may be used to temporarily store a data block waiting to be processed, such that the data block waiting to be processed may not block other data blocks from using a processing engine. Circuit 1030 may keep track of the next expected chunk ID and provide the next expected chunk ID to order solver logic 1010. Circuit 1040 may keep a list of IDs of data blocks that will not pass through the next processing stage (e.g., stage N+1).

Order solver logic 1010 may determine which data block would be sent to the next processing stage based on the chunk IDs of the data blocks, the next expected chunk ID from circuit 1030, and the list of IDs of data blocks that will not pass through the next processing stage from circuit 1040. For example, in some cases as shown in FIG. 10, order solver logic 1010 may receive a data block No. 4 with a chunk ID, and may temporarily store data block No. 4 in memory block 1020 if data block No. 4 is not the next data block to be processed by stage N+1 because the chunk ID of data block No. 4 does not match the next expected chunk ID. In this way, data block No. 4 that is received out of order would not block the data processing path.

Order solver logic 1010 may then receive data block No. 1, which may include the chunk ID that is identified as the next expected chunk ID by circuit 1030. Order solver logic 1010 may include data block No. 1 in output data 1050 for sending to stage N+1. Circuit 1030 may update the next expected chunk ID. Order solver logic 1010 may then determine if any data block saved in memory block 1020 is the next expected data block based on the next expected chunk ID determined by circuit 1030. If the next expected data block is not in memory block 1020, order solver logic 1010 may wait for the next expected data block.

Subsequently, order solver logic 1010 may receive data block No. 2 in incoming data 1060 from stage N. The chunk ID of data block No. 2 may be in the list of IDs of data blocks that will not pass through stage N+1 (which may be determined based on, for example, routing information in the data blocks). Thus, order solver logic 1010 may not send data block No. 2 to output data 1050 for sending to stage N+1. Rather, circuit 1030 may update the next expected chunk ID, and order solver logic 1010 may determine if any data block saved in memory block 1020 is the next expected data block. If the new next expected data block is not in memory block 1020, order solver logic 1010 may wait for the new next expected data block.

Afterwards, order solver logic 1010 may receive data block No. 3 in incoming data 1060 from stage N. Order solver logic 1010 may determine that data block No. 3 is the next data block to be processed by stage N+1 based on the next expected chunk ID provided by circuit 1030, and send data block No. 3 to stage N+1. Circuit 1030 may then update the next expected chunk ID, and order solver logic 1010 may determine if any data block saved in memory block 1020 is the next expected data block. In the example shown in FIG. 10, the next expected data block may be data block No. 4, which is stored in memory block 1020. Thus, order solver logic 1010 may move the stored data block No. 4 from memory block 1020 and send it to stage N+1.

In this way, the received data blocks may be reordered based on the sequence that they are desired to be processed by the next processing stage before being sent to the next stage for processing, rather than being passed on to the next processing stage in the order that they are sent from the previous processing stage.

Figure 11:
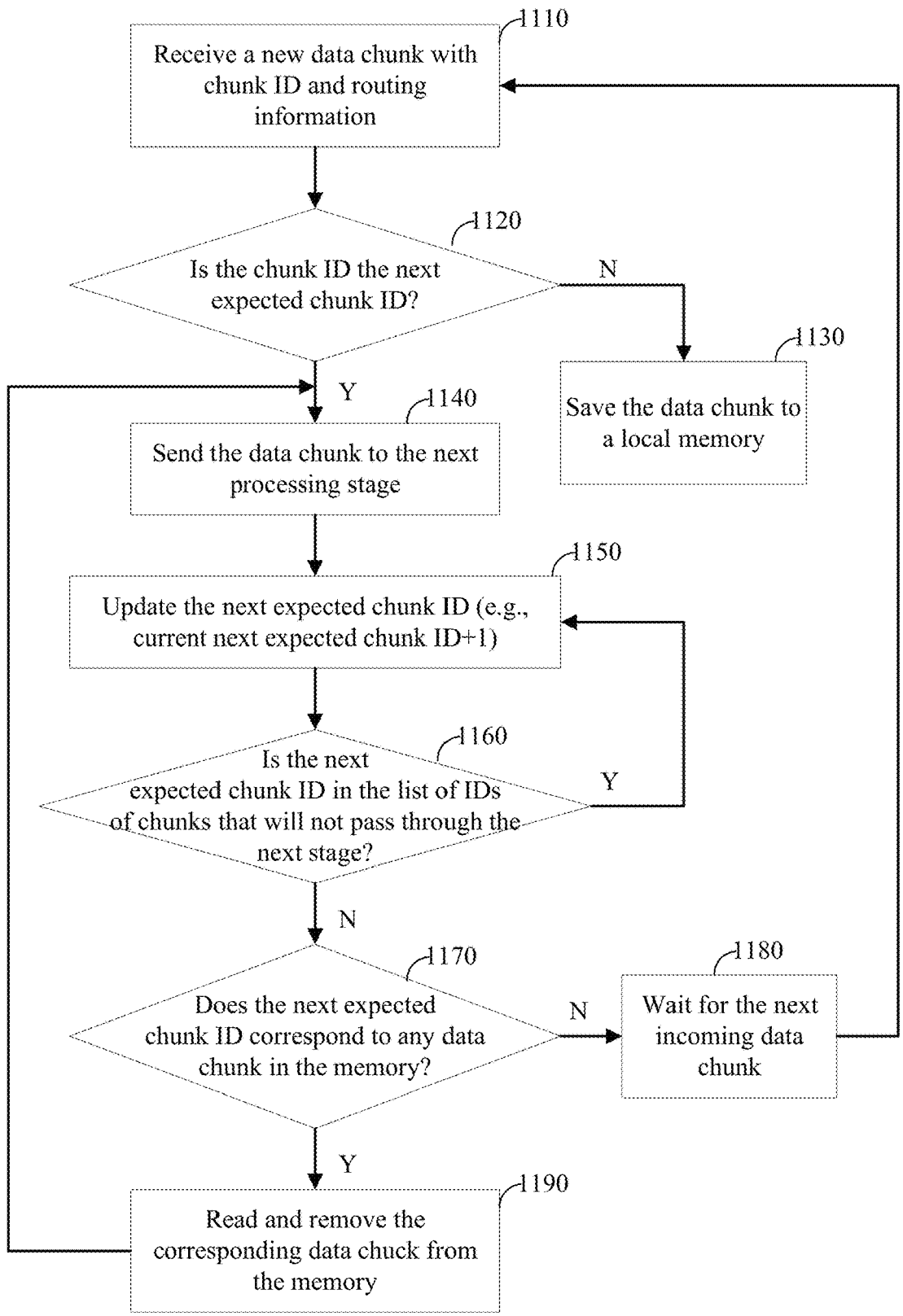
FIG. 11 is a simplified flow chart illustrating example operations of an order-keeping circuit, according to certain embodiments.

FIG. 11 is a simplified flow chart 1100 illustrating example operations of an order-keeping circuit, such as order-keeping circuit 1000 of FIG. 10, according to certain embodiments. At block 1110, the order-keeping circuit may receive a new data block from an upstream processing stage. The data block may include a chunk ID and routing information for the data block as described above.

At block 1120, the order-keeping circuit (e.g., order solver logic 1010) may determine if the chunk ID of the received data block is the next data block to be processed by the downstream processing stage in the pipeline based on, for example, the next expected chunk ID provided by circuit 1030. If the chunk ID of the received data block does not match with the next expected chunk ID, the received data block may be save to a local memory (e.g., memory block 1020 of FIG. 10) at block 1130. If the chunk ID of the received data block matches the next expected chunk ID, the received data block may be sent to the next processing stage at block 1140. Subsequently, the next expected chunk ID may be updated at block 1150. For example, the current next expected chunk ID may be increased by a constant number (e.g., 1) to generate the updated next expected chunk ID.

At block 1160, the order solver logic may determine if the next expected chunk ID is in a list of IDs of data blocks that will not pass through the next stage. As described above, the list of IDs of data blocks that will not pass through and be processed by the next stage may be determined based on the routing information associated with the data blocks, and may be saved in a memory, such as circuit 1040. If the next expected chunk ID is in the list of IDs of data blocks that will not be processed by the next stage, the current next expected chunk ID may be skipped and the next expected chunk ID may be updated at block 1150. If the next expected chunk ID does not match any ID in the list of IDs of data blocks that will not be processed by the next stage, the order solver logic may determine if the next expected chunk ID corresponds to any data block in the local memory at block 1170.

At block 1170, if it is determined that the next expected chunk ID matches the chunk ID of a data block in the local memory (e.g., memory block 1020), the data block with the matching chunk ID in the local memory may be read and removed from the local memory at block 1190 and may be sent to the next processing stage at block 1140. If the next expected chunk ID does not match the chunk ID of any data block in the local memory, the order solver logic may wait for the next incoming data block at block 1180, and may proceed to block 1110 after a new data block is received.

In this way, the incoming data blocks may be reordered based on the sequence that they are expected to be processed by the next stage, rather than based on the order that they are received from the previous processing stage(s). For example, an order-keeping circuit in front of the output port of the pipeline may reorder the data blocks after the last processing stage before sending the data blocks to the output port of the pipeline.

As described above, additional circuits, such as order keepers 960-a, 960-b, 960-c, and 1000 may be used to manage the data processing by the pipeline. For example, in some circumstances, it may be desirable that a first data block be processed first by engine 1 and then processed by engine 2, while a second data block be processed first by engine 2 and then processed by engine 1. The first data block may try to enter engine 2 after being processed by engine 1. At the same time, the second data block may try to enter engine 1 after being processed by engine 2. However, because the second data block has not entered engine 1 and the first data block has not entered engine 2, the second data block may still be within engine 2 and the first data block may still be within engine 1. As such, the second data block could not enter engine 1 and the first data block could not enter engine 2. Thus, a deadlock situation may occur. An order keeper may anticipate the deadlock situation based on the desired configuration of the pipeline specified in the routh field in the header of each data block, and may prevent the deadlock situation by, for example, preventing the second data block from entering engine 2 before the first data block entering engine 2. In some implementations where a memory block is available after a processing engine, the order keeper may prevent the deadlock situation by, for example, storing the second data block in a memory block after the second data block has been processed by engine 2 (or storing the first data block in a memory block after the first data block has been processed by engine 1), such that the first data block may enter engine 2 (or the second data block may enter engine 1).

In another example, two different data blocks may be processed by the processing engines on two different paths, and thus may exit the pipeline in an order that is different from the order that they enter the pipeline. For example, a first data block may be processed by processing engines 1, 2, 3, 4, and 5, while a second data block may be processed by processing engines 1 and 5 only. Thus, when the first data block is processed by engine 2, the second data block may be processed by engine 1. Afterwards, the first data block may be processed by engine 3, while the second data block may be processed by engine 5. Thus, the second data block may exit the pipeline before the first data block. As such, the data blocks may exit the pipeline out of order. To prevent such a situation, an order keeper may be placed before the output port of the pipeline. For example, the order keeper may be order keeper 960-c or may be included in switch 950-a of FIG. 9. The order keeper may ensure that the first data block goes to the output port before the second data block by, for example, delaying the processing of the second data block or temporarily storing the second data block after it has been processed by engine 5.

In some cases, some data blocks may be larger than other data blocks, and thus may be processed by a processing engine for a longer period of time. When a short data block enters a pipeline after a large data block, the short data block may be processed by a first engine, while the large data block may be processed by a second engine. The first engine may finish processing the short data block before the second engine finishes processing the large data block. Because the large data block is still within the second engine, the short data block would not enter the second engine right after it has been processed by the first engine. Thus, the first data block may stay in the first engine (for example, in a buffer before or after being processed) or the processing of the short data block by the first engine may be delayed, before the second engine finishes processing the large data block. As such, no other data blocks may be able to use the first engine before the second engine finishes processing the large data block. In other words, the large data block may block the processing paths of some other data blocks. In some implementations, the order keeper described above may temporarily store the short data block processed by the first engine in, for example, memory block 1020 of order-keeping circuit 1000 before the second engine becomes available. Therefore, the first engine may be used by other data blocks, such as another large data block that may be processed by the first engine for a relatively long time period, or by a data block that may be processed by a processing path that does not use the second engine.

Figure 12:
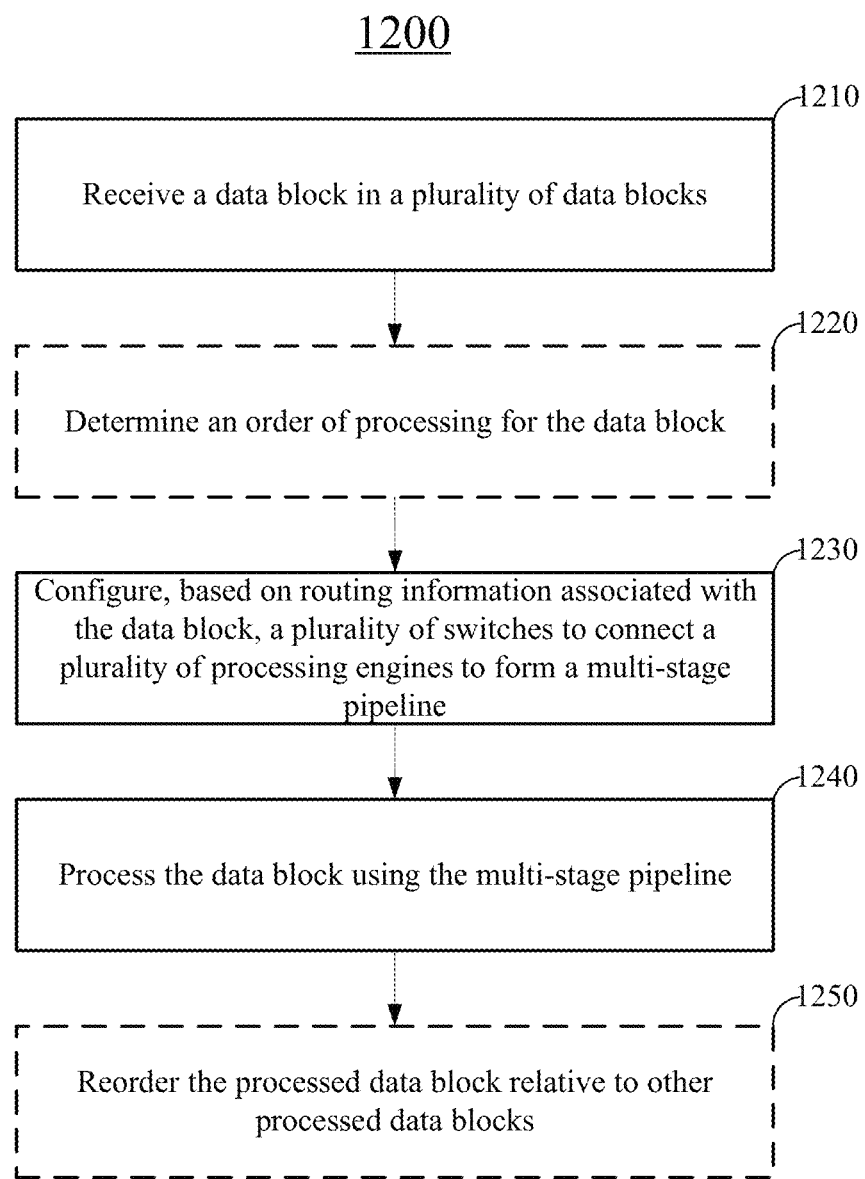
FIG. 12 is a simplified flow chart illustrating an example method for processing data blocks using a configurable pipeline processing circuit, according to certain embodiments.

FIG. 12 is a simplified flow chart 1200 illustrating an example method for processing data using a configurable pipeline, according to certain embodiments. The pipeline may include a plurality of processing engines or stages, where the plurality of processing engines may perform different data processing operations. The method may be performed by, for example, configurable pipelines 300, 400, 650, and 900 described above.

At block 1210, a configurable pipeline may receive a data block of a plurality of data blocks. The data block may include a packet or other network transport unit. The data block may include routing information in a header or in the meta-data for the data block. The routing information may indicate how the configurable pipeline is to be configured. In some implementations, the data block may include an identification number. The identification numbers of the plurality of data blocks may indicate the order in which the plurality of data blocks are to be processed. The identification numbers of the plurality of data blocks may also help to ensure a proper order in the output data from the configurable pipeline.

Optionally, at block 1220, the configurable pipeline may determine an order that the data block is to be processed among the plurality of data blocks. The determination may be based on the routing information and/or the identification number of the data block. For example, the order of processing may be determined based on the desired configuration of the configurable pipeline and the available processing resources. In some implementations, the order of processing may be based on the identification number of the data block, which may indicate a sequence number or the priority of the data block. The order determination may be performed by an order-keeping circuit described above.

At block 1230, a plurality of switches of the configurable pipeline may be configured based on the routing information associated with the data block to connect multiple processing engines of the configurable pipeline in a desired order to form a multi-stage pipeline for the data block, as described above with respect to, for example, FIG. 7. As also described above, the plurality of switches may include switches with low complexity, such as switches with a small number of input ports and output ports (e.g., 2×2 switches). In some implementations, a switch that may be constructed using multiple small switches, such as 2×2 switches, may be used. The processing engines and the switches may be placed and connected in a way such that the input port of any processing engine can be electrically coupled to the output port of any processing engine using the switches, while the number of connections can be reduced because some connections may be reused for connecting the processing engines. As such, any combination of the multiple processing engines can be achieved by controlling the switching of the switches. For example, some processing engines may be used more than once in the multi-stage pipeline. Some processing engines may not be used in a multi-stage pipeline.

At block 1240, the multi-stage pipeline may process the data block using the processing engines in the multi-stage pipeline. Each processing engine may perform a different data processing function, such as data encryption, data compression, digital signature, redundancy check, parity check, error correction, etc. In some implementations, order-keeping circuits may be included in the pipeline. In some implementations, an order-keeping circuit may include a memory block for temporarily storing a data block. In some implementations, the order-keeping circuit may be used to prevent deadlocks, prevent a data block from blocking a data processing path, and/or prevent out-of-order data processing. In some implementations, the order-keeping circuit may be one processing engine of the multiple processing engines in the configurable pipeline, and thus can be used more than once at any desired stage in a configured multi-stage pipeline by configuring the switches accordingly.

Optionally, at block 1250, an order-keeping circuit may reorder the processed data block relative to other processed data blocks before sending the processed data block to the output port of the multi-stage pipeline. In some implementations, the reordering may be performed based on the identification number of the data block.

Even though FIG. 12 describes the example method as sequential operations, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Figure 13:
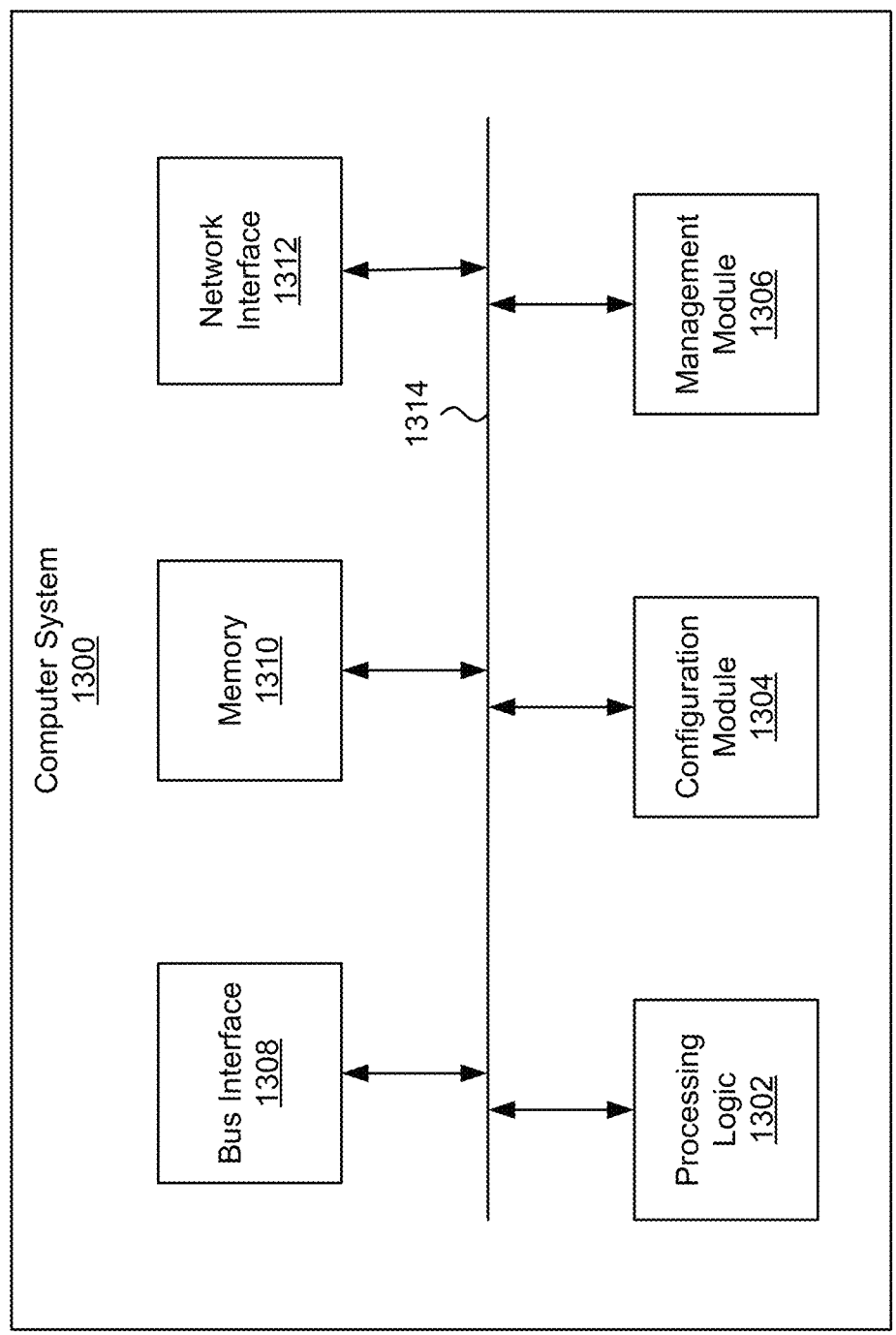
FIG. 13 illustrates an example computer system that may use the configurable pipeline structure described above.

FIG. 13 illustrates an example of a computer system 1300 that may use the configurable pipeline structure described above. Functionality and/or several components of the computer system 1300 may be used without limitation with other embodiments disclosed elsewhere in this disclosure, without limitations. For example, computer system 1300 may function as a network device that may facilitate processing of packets and/or forwarding of packets from the computer system 1300 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computer system 1300 may be the recipient and/or generator of packets. In some implementations, the computer system 1300 may modify the contents of the packet before forwarding the packet to another device. The computer system 1300 may be a peripheral device coupled to another computer device, a switch, a router or any other suitable device enabled for receiving and forwarding packets.

In one example, the computer system 1300 may include processing logic 1302, a configuration module 1304, a management module 1306, a bus interface module 1308, memory 1310, and a network interface module 1312. These modules may be hardware modules, software modules, or a combination of hardware and software. In certain instances, modules may be interchangeably used with components or engines, without deviating from the scope of the disclosure. The computer system 1300 may include additional modules, not illustrated here, such as components discussed with respect to the nodes disclosed in FIG. 14. In some implementations, the computer system 1300 may include fewer modules. In some implementations, one or more of the modules may be combined into one module. One or more of the modules may be in communication with each other over a communication channel 1314. The communication channel 1314 may include one or more busses, meshes, matrices, fabrics, a combination of these communication channels, or some other suitable communication channel.

The processing logic 1302 may use the configurable pipeline structure described above. The processing logic 1302 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1302 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1302 may be stored on a computer-readable storage medium, for example, in the form of a computer program. The computer-readable storage medium may be non-transitory. In some cases, the computer-readable medium may be part of the memory 1310.

The memory 1310 may include either volatile or non-volatile, or both volatile and non-volatile types of memory. The memory 1310 may, for example, include random access memory (RAM), read only memory (ROM), Electrically Erasable Programmable Read-Only Memory (EEPROM), flash memory, and/or some other suitable storage media. In some cases, some or all of the memory 1310 may be internal to the computer system 1300, while in other cases some or all of the memory may be external to the computer system 1300. The memory 1310 may store an operating system comprising executable instructions that, when executed by the processing logic 1302, provides the execution environment for executing instructions providing networking functionality for the computer system 1300. The memory may also store and maintain several data structures and routing tables for facilitating the functionality of the computer system 1300.

In some implementations, the configuration module 1304 may include one or more configuration registers. Configuration registers may control the operations of the computer system 1300. In some implementations, one or more bits in the configuration register can represent certain capabilities of the computer system 1300. Configuration registers may be programmed by instructions executing in the processing logic 1302, and/or by an external entity, such as a host device, an operating system executing on a host device, and/or a remote device. The configuration module 1304 may further include hardware and/or software that control the operations of the computer system 1300.

In some implementations, the management module 1306 may be configured to manage different components of the computer system 1300. In some cases, the management module 1306 may configure one or more bits in one or more configuration registers at power up, to enable or disable certain capabilities of the computer system 1300. In certain implementations, the management module 1306 may use processing resources from the processing logic 1302. In other implementations, the management module 1306 may have processing logic similar to the processing logic 1302, but segmented away or implemented on a different power plane than the processing logic 1302.

The bus interface module 1308 may enable communication with external entities, such as a host device and/or other components in a computing system, over an external communication medium. The bus interface module 1308 may include a physical interface for connecting to a cable, socket, port, or other connection to the external communication medium. The bus interface module 1308 may further include hardware and/or software to manage incoming and outgoing transactions. The bus interface module 1308 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1308 may include the physical layer for any of these bus protocols, including a connector, power management, and error handling, among other things. In some implementations, the computer system 1300 may include multiple bus interface modules for communicating with multiple external entities. These multiple bus interface modules may implement the same local bus protocol, different local bus protocols, or a combination of the same and different bus protocols.

The network interface module 1312 may include hardware and/or software for communicating with a network. This network interface module 1312 may, for example, include physical connectors or physical ports for wired connection to a network, and/or antennas for wireless communication to a network. The network interface module 1312 may further include hardware and/or software configured to implement a network protocol stack. The network interface module 1312 may communicate with the network using a network protocol, such as for example TCP/IP, InfiniBand, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer system 1300 may include multiple network interface modules, each configured to communicate with a different network. For example, in these implementations, the computer system 1300 may include a network interface module for communicating with a wired Ethernet network, a wireless 802.11 network, a cellular network, an InfiniBand network, etc.

The various components and modules of the computer system 1300, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 14.

Figure 14:
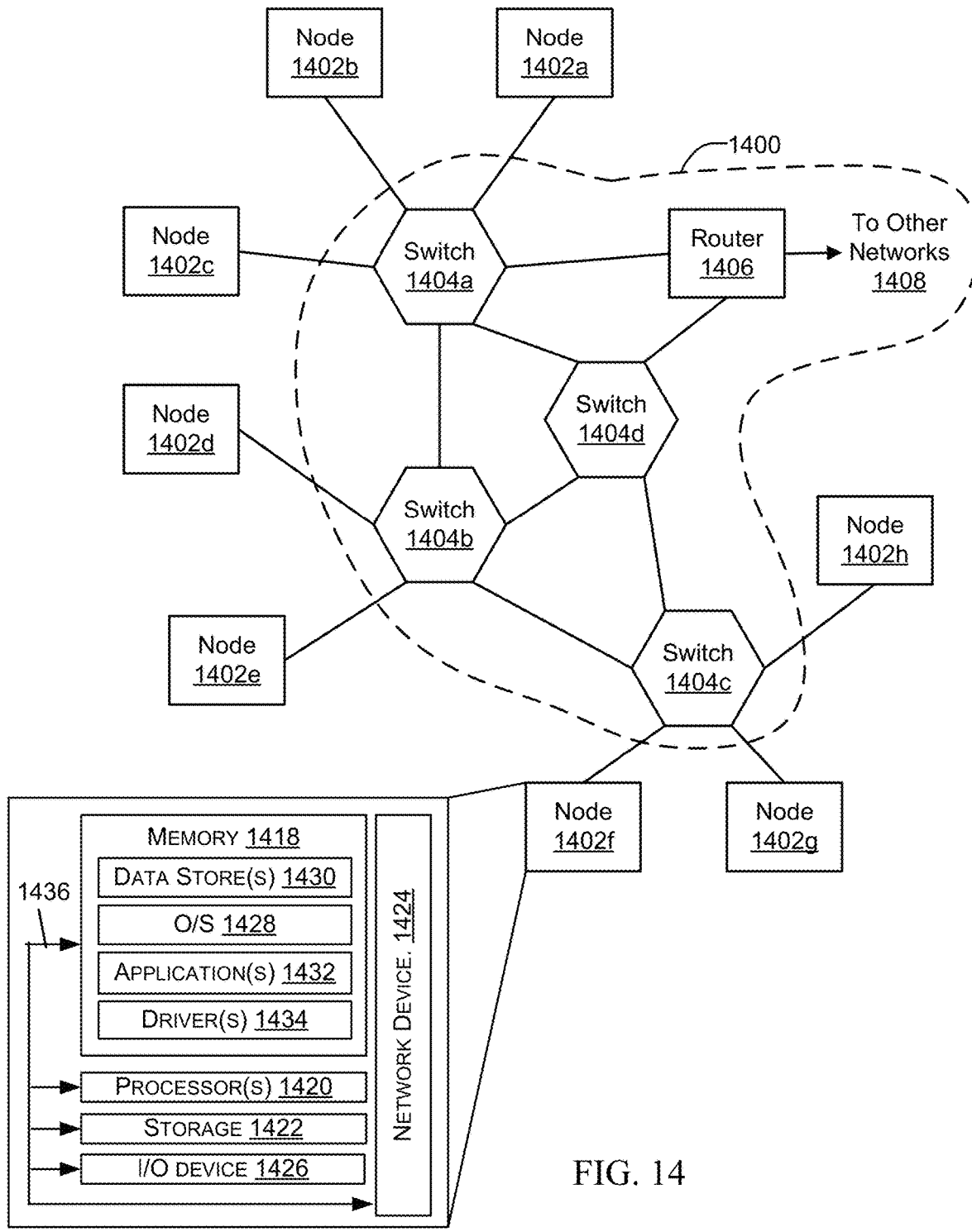
FIG. 14 illustrates an example architecture for features and systems described herein that includes one or more service provider computers and/or a user device connected via one or more networks, according to certain aspects of the disclosure.

FIG. 14 illustrates a network 1400, illustrating various different types of computer systems 1300 (e.g., network devices) of FIG. 13, such as nodes comprising the network device, switches and routers. In certain embodiments, the network 1400 may be based on a switched architecture with point-to-point links. As illustrated in FIG. 14, the network 1400 includes a plurality of switches 1404a-1404d, which may be arranged in a network. In some cases, the switches are arranged in a multi-layered network, such as a Clos network. A computer system 1300 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1404a-1404d may be connected to a plurality of nodes 1402a-1402h and provide multiple paths between any two nodes.

The network 1400 may also include one or more computer systems 1300 for connection with other networks 1408, such as other subnets, LANs, wide area networks (WANs), or the Internet, and may be referred to as routers 1406. Routers use headers and forwarding tables to determine the best path for forwarding the packets, and use protocols such as internet control message protocol (ICMP) to communicate with each other and configure the best route between any two devices.

In some examples, network(s) 1400 may include any one or a combination of many different types of networks, such as cable networks, the Internet, wireless networks, cellular networks and other private and/or public networks. Interconnected switches 1404a-1404d and router 1406, if present, may be referred to as a switch fabric, a fabric, a network fabric, or simply a network. In the context of a computer network, terms "fabric" and "network" may be used interchangeably herein.

Nodes 1402a-1402h may be any combination of host systems, processor nodes, storage subsystems, and I/O chassis that represent user devices, service provider computers or third party computers.

User devices may include computing devices to access an application 1432 (e.g., a web browser or mobile device application). In some aspects, the application 1432 may be hosted, managed, and/or provided by a computing resources service or service provider. The application 1432 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1408. Additionally, the user device(s) may be part of the distributed system managed by, controlled by, or otherwise part of the service provider computer(s) (e.g., a console device integrated with the service provider computers).

The node(s) of FIG. 14 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1432 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1402a-1402h may include at least one memory 1418 and one or more processing units (or processor(s) 1420). The processor(s) 1420 may be implemented in hardware, computer-executable instructions, firmware, or combinations thereof. Computer-executable instruction or firmware implementations of the processor(s) 1420 may include computer-executable or machine-executable instructions written in any suitable programming language to perform the various functions described.

In some instances, the hardware processor(s) 1420 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1418 may store program instructions that are loadable and executable on the processor(s) 1420, as well as data generated during the execution of these programs. Depending on the configuration and type of the node(s) 1402a-1402h, the memory 1418 may be volatile (such as RAM) and/or non-volatile (such as ROM, flash memory, etc.). The memory 1418 may include an operating system 1428, one or more data stores 1430, one or more applications 1432, one or more drivers 1434, and/or services for implementing the features disclosed herein.

The operating system 1428 may support nodes 1402a-1402h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1428 may also be a proprietary operating system.

The data stores 1430 may include permanent or transitory data used and/or operated on by the operating system 1428, application(s) 1432, or drivers 1434. Examples of such data include web pages, video data, audio data, images, user data, and so on. The information in the data stores 1430 may, in some implementations, be provided over the network(s) 1408 to user devices 1404. In some cases, the data stores 1430 may additionally or alternatively include stored application programs and/or drivers. Alternatively or additionally, the data stores 1430 may store standard and/or proprietary software libraries, and/or standard and/or proprietary application user interface (API) libraries. Information stored in the data stores 1430 may be machine-readable object code, source code, interpreted code, or intermediate code.

The drivers 1434 include programs that may provide communication between components in a node. For example, some drivers 1434 may provide communication between the operating system 1428 and additional storage 1422, network device 1424, and/or I/O device 1426. Alternatively or additionally, some drivers 1434 may provide communication between applications 1432 and the operating system 1428, and/or applications 1432 and peripheral devices accessible to the service provider computer. In many cases, the drivers 1434 may include drivers that provide well-understood functionality (e.g., printer drivers, display drivers, hard disk drivers, Solid State Device drivers). In other cases, the drivers 1434 may provide proprietary or specialized functionality.

The service provider computer(s) or servers may also include additional storage 1422, which may include removable storage and/or non-removable storage. The additional storage 1422 may include magnetic storage, optical disks, solid state disks, flash memory, and/or tape storage. The additional storage 1422 may be housed in the same chassis as the node(s) 1402a-1402h or may be in an external enclosure. The memory 1418 and/or additional storage 1422 and their associated computer-readable media may provide non-volatile storage of computer-readable instructions, data structures, program modules, and other data for the computing devices. In some implementations, the memory 1418 may include multiple different types of memory, such as SRAM, DRAM, or ROM.

The memory 1418 and the additional storage 1422, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1418 and the additional storage 1422 are examples of computer storage media. Additional types of computer storage media that may be present in the node(s) 1402a-1402h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1402a-1402h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1402a-1402h may also include I/O device(s) 1426, such as a keyboard, a mouse, a pen, a voice input device, a touch input device, a display, speakers, a printer, and the like. The node(s) 1402a-1402h may also include one or more communication channels 1436. A communication channel 1436 may provide a medium over which the various components of the node(s) 1402a-1402h can communicate. The communication channel or channels 1436 may take the form of a bus, a ring, a switching fabric, or a network.

The node(s) 1402a-1402h may also contain network device(s) 1424 that allow the node(s) 1402a-1402h to communicate with a stored database, another computing device or server, user terminals and/or other devices on the network(s) 1400. The network device(s) 1424 of FIG. 14 may include similar components discussed with reference to the computer system 1300 of FIG. 13.

In some implementations, the network device 1424 is a peripheral device, such as a PCI-based device. In these implementations, the network device 1424 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1308 may implement NVMe, and the network device 1424 may be connected to a computing system using a PCIe interface.

A PCI-based device may include one or more functions. A "function" describes operations that may be provided by the network device 1424. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1424 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer-readable medium and processed by a processor in any of the computer systems described herein. It should be noted that the described processes and architectures can be performed either in real-time or in an asynchronous mode prior to any user interaction. The modules may be configured in the manner suggested in FIG. 13, FIG. 14, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A configurable multi-stage processing circuit, comprising:
   an order-keeping circuit, and
   a plurality of processing engines, each of the processing engines comprising:
     an input port;
     an output port; and
     a circuit configured to perform a data processing function; and
   a plurality of 2×2 switches,
   wherein, for each of the processing engines,
     the input port of the processing engine is electrically connected to an output port of only one of the 2×2 switches;
     the output port of the processing engine is electrically connected to an input port of only another one of the 2×2 switches; and
     the 2×2 switches are arranged such that the input port of the processing engine is electrically connectable to the output port of each of the processing engines by the 2×2 switches; and
   wherein the 2×2 switches are configurable to:
     connect the processing engines to form a first pipeline for processing a first data block based on routing information associated with the first data block; and
     connect the processing engines to form a second pipeline for processing a second data block based on routing information associated with the second data block, the second pipeline being different from the first pipeline,
   wherein each processing engine of the plurality of processing engines has a single input port and a single output port in the multi-stage processing circuit, and
   wherein the order-keeping circuit is connected between an output port of one of the 2×2 switches and an input port of one of the processing engines, and
   wherein the order-keeping circuit is configured to reorder processed data blocks based on identifications of the data blocks before the processed data blocks are sent to an output of the configurable multi-stage processing circuit.

2. The configurable multi-stage processing circuit of claim 1, further comprising:
   an order-keeping circuit configured to maintain an order of processing of a plurality of data blocks using the processing engines.

3. The configurable multi-stage processing circuit of claim 1, wherein:
   the processing engines comprises K processing engines, wherein K is equal to or greater than two;
   the switches comprise K+1 2×2 switches; and
   the output port of each of the K processing engines is connected to an input port of another processing engine of the K processing engines by one of the K+1 2×2 switches.

4. A circuit, comprising:
   a plurality of processing engines, each of the processing engines including an input port and an output port;
   an order-keeping circuit, and
   a plurality of switches, each switch comprising two input ports and two output ports,
   wherein, for each of the processing engines,
     the input port of the processing engine is electrically connected to an output port of only one of the switches;
     the output port of the processing engine is electrically connected to an input port of only another one of the switches;
     the input port of the processing engine is electrically connected to the output port of each of the processing engines by the switches,
   wherein each processing engine of the plurality of processing engines has a single input port and a single output port in the circuit,
   wherein the order-keeping circuit is connected between an output port of one of the plurality of switches and an input port of one of the processing engines, and
   wherein the order-keeping circuit is configured to reorder processed data blocks based on identifications of the data blocks before the processed data blocks are sent to an output of the circuit.

5. The circuit of claim 4, wherein:
   the switches are 2×2 switches.

6. The circuit of claim 4, wherein:
   the switches include a 2×2 switch and a N×M switch, wherein:
     N and M are equal to or greater than 2;
     an input port of the 2×2 switch is connected to an input of the circuit; and
     an output port of the 2×2 switch is connected to an output of the circuit.

7. The circuit of claim 6, wherein:
the N×M switch comprises a plurality of 2×2 switches.

8. The circuit of claim 4, wherein:
the processing engines comprise K processing engines, wherein K is equal to or greater than two;
the switches comprise K+1 2×2 switches; and
the output port of each processing engine of the K processing engines is connected to an input port of another processing engine of the K processing engines by one of the switches.

9. The circuit of claim 8, wherein each of the K+1 2×2 switches comprises:
two input ports; and
two output ports,
wherein, for each of K of the switches,
a first output port of the 2×2 switch is connected to a first input port of another 2×2 switch;
a second output port of the 2×2 switch is connected to the input port of a particular processing engine of the K processing engines; and
the output port of the particular processing engine is connected to a second input port of the another 2×2 switch.

10. The circuit of claim 4, wherein:
each of the data blocks comprises a unique identification; and
the order-keeping circuit maintains an order of processing of the data blocks based on the unique identifications of the data blocks.

11. The circuit of claim 4, wherein:
each of the data blocks comprises routing information associated with the data block; and
the switches are configurable to connect the processing engines to form a pipeline for the data block based on the routing information.

12. The circuit of claim 11, wherein:
the order-keeping circuit maintains the order of processing of the data blocks based on the routing information associated with the data blocks.

13. The circuit of claim 4, wherein:
the order-keeping circuit comprises a memory block configured to store a data block before or after the data block is processed by one of the processing engines.

14. A computer-implemented method, comprising:
receiving a data block to be processed by a processing circuit, wherein:
the processing circuit comprises a plurality of processing engines connected together by a plurality of switches, each switch comprising two input ports and two output ports; and
the data block comprises routing information;
configuring the switches based on the routing information to connect the processing engines to form a multi-stage pipeline; and
processing the data block using the multi-stage pipeline;
wherein the configuring comprises, for each of the plurality of processing engines:
electrically connecting an input port of the processing engine to an output of only one of the switches, and
electrically connecting an output port of the processing engine to an input of only another one of the switches, wherein each processing engine of the plurality of processing engines has a single input port and a single output port in the multi-stage pipeline, and
reordering, by an order-keeping circuit, processed data blocks based on identifications of the data blocks before the processed data blocks are sent to an output of the circuit, wherein the order-keeping circuit is connected between an output port of one of the plurality of switches and an input port of one of the processing engines.

15. The computer-implemented method of claim 14, further comprising:
receiving a plurality of data blocks, each of the data blocks comprising an identification and corresponding routing information; and
determining an order of processing for the data block based on, the identification and the routing information of the data block and the corresponding identifications and routing information for the data blocks.

16. The computer-implemented method of claim 14, further comprising:
receiving a plurality of data blocks, each of the data blocks comprising corresponding routing information and an identification;
for each of the data blocks,
configuring the switches based on the corresponding routing information to connect the processing engines to form a multi-stage pipeline; and
processing the data block using the multi-stage pipeline.

* * * * *